(12) United States Patent
Dalal (10) Patent No.: US 11,448,135 B2
(45) Date of Patent: Sep. 20, 2022

(54) SYSTEMS AND METHODS OF POWER ALLOCATION FOR TURBOPROP AND TURBOSHAFT AIRCRAFT

(71) Applicant: GE AVIATION SYSTEMS LLC, Grand Rapids, MI (US)

(72) Inventor: Manish Ashvinkumar Dalal, Centerville, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 16/937,147

(22) Filed: Jul. 23, 2020

(65) Prior Publication Data

US 2022/0025820 A1 Jan. 27, 2022

(51) Int. Cl.
| | |
|---|---|
| *F02C 7/32* | (2006.01) |
| *F01D 15/10* | (2006.01) |
| *B64D 27/24* | (2006.01) |
| *F02C 7/36* | (2006.01) |
| *B64D 41/00* | (2006.01) |

(52) U.S. Cl.
CPC ............... *F02C 7/32* (2013.01); *B64D 27/24* (2013.01); *F01D 15/10* (2013.01); *F02C 7/36* (2013.01); *B64D 2041/002* (2013.01); *F05D 2220/323* (2013.01); *F05D 2220/36* (2013.01); *F05D 2220/60* (2013.01)

(58) Field of Classification Search
CPC ... F02C 7/32; F02C 7/36; B64D 27/24; B64D 2041/002; F01D 15/10; F05D 2220/60; F05D 2220/36; F05D 2220/323
See application file for complete search history.

(56) References Cited

U.S. PATENT DOCUMENTS

| | | |
|---|---|---|
| 7,468,561 B2 | 12/2008 | Kern et al. |
| 8,928,166 B2 | 1/2015 | Seger et al. |
| 9,021,780 B2 | 5/2015 | Bowman et al. |
| 9,328,661 B2 | 5/2016 | Ho et al. |
| 9,828,870 B2 | 11/2017 | Ho |
| 10,443,504 B2 | 10/2019 | Dalal |
| 10,530,163 B2 | 1/2020 | Rodriguez et al. |

(Continued)

FOREIGN PATENT DOCUMENTS

| | | |
|---|---|---|
| EP | 3406526 A2 | 11/2018 |
| EP | 3412575 A1 | 12/2018 |
| EP | 3418197 A1 | 12/2018 |

*Primary Examiner* — Joseph Ortega
(74) *Attorney, Agent, or Firm* — McGarry Bair PC (57) ABSTRACT

Systems and method for an electrical system on an aircraft are provided. In example aspects, the electrical system can be for an aircraft having a turbine engine. The turbine engine having a high pressure (HP) spool and a low pressure (LP) spool. The HP spool can be configured to drive a first generator to provide a first electrical output. The LP spool can be configured to drive a second generator to provide a second electrical output. The first generator and the second generator can be coupled to an electrical power distribution bus that provides electrical power to multiple high power demand loads. A propulsion system and a multiple aircraft systems bus can both be coupled to the electrical power distribution bus. The electrical system can further include a control system configured to allocate power among the first generator, the second generator, and the propulsion system, and the secondary aircraft systems bus.

11 Claims, 4 Drawing Sheets

(56) References Cited

U.S. PATENT DOCUMENTS

| | | |
|---|---|---|
| 10,644,630 B2 * | 5/2020 | Smith .................. F02C 7/36 |
| 2017/0129617 A1 * | 5/2017 | Shah .................. B64D 27/24 |
| 2018/0112599 A1 * | 4/2018 | Dalal .................. F02N 11/04 |
| 2018/0291807 A1 * | 10/2018 | Dalal .................. F02K 5/00 |
| 2019/0002116 A1 | 1/2019 | Gansler et al. |
| 2019/0061962 A1 | 2/2019 | Nolcheff et al. |
| 2019/0085765 A1 | 3/2019 | Nolcheff et al. |

* cited by examiner

SYSTEMS AND METHODS OF POWER ALLOCATION FOR TURBOPROP AND TURBOSHAFT AIRCRAFT

TECHNICAL FIELD

The present subject matter relates generally to a power system for an aircraft.

BACKGROUND

A conventional commercial aircraft generally includes a fuselage, a pair of wings, and a propulsion system that provides thrust. The propulsion system includes at least two aircraft engines, such as turboprop or turboshaft engines. Each engine can be mounted to a respective portion of the aircraft, such as in a suspended position beneath a wing.

BRIEF DESCRIPTION

One example aspect of the present disclosure relates to an aircraft system comprising, a first turbine engine, the first turbine engine having a first high pressure (HP) spool and a first low pressure (LP) spool, the first HP spool configured to drive a first generator and provide a first electrical output, the LP spool configured to drive a second generator and provide a second electrical output, the first generator and the second generator coupled to an electrical power distribution bus that provides electrical power to a first load, a second load, and a third load, a first propeller coupled to the first LP spool, wherein the first propeller is driven by the first turbine engine, a propulsion system defined by a first propeller, a first aircraft systems bus coupled to the electrical power distribution bus, a second aircraft systems bus coupled to the electrical power distribution bus, a third aircraft systems bus coupled to the electrical power distribution bus, and a control system configured to allocate power among each generator, a propulsion system controller (PSC), each aircraft systems bus, and one or more bus power control unit (BPCU) controllers, wherein the control system controls power allocation among each generator and the propulsion system, and the control system controls power delivery from the electrical power distribution bus to each aircraft systems bus.

Another aspect of the present disclosure relates to a method of powering an aircraft system having a first turbine engine, the first turbine engine having a first high pressure (HP) spool and a first low pressure (LP) spool, the first HP spool configured to drive a first generator and provide a first electrical output, the first LP spool coupled to a propeller configured to drive a second generator, provide a second electrical output, and drive the propeller, the method comprising, splitting a total power from the first turbine engine to the second generator and the propeller, providing the first electrical output from the first generator to an electrical power distribution bus, providing the second electrical output from the second generator to the electrical power distribution bus, coupling a first aircraft systems bus, a second aircraft systems bus, and a third aircraft systems bus to the electrical power distribution bus, and managing a power allocation among the first generator and the second generator, to the first aircraft systems bus, a second aircraft systems bus, and a third aircraft systems bus from the electrical power distribution bus via a control system having a propulsion system controller (PSC) communicatively coupled to at least one bus power control unit controllers (BPCU) and at least one FADEC.

Another aspect of the present disclosure relates to an electrical system for an aircraft having a first turbine engine, the first turbine engine having a first high pressure (HP) spool and a first low pressure (LP) spool, the electrical system comprising, a first generator coupled to the first HP spool driven by the first turbine engine and providing a first electrical output, a second generator coupled to the first LP spool driven by the first turbine engine and providing a second electrical output, the first generator and the second generator coupled to an electrical power distribution bus that provides electrical power to a first load, a second load, and a third load, a propulsion system controller coupled to the electrical power distribution bus, a first aircraft systems bus, a second aircraft systems bus, and a third aircraft systems bus coupled to the electrical power distribution bus, a first load, a second load, and a third load coupled to the first aircraft systems bus, the second aircraft systems bus, and the third aircraft systems bus respectively; and a control system configured to allocate power to at least one of the first load, the second load, and the third load from the first generator and the second generator via the propulsion system controller, the first aircraft systems bus, the second aircraft systems bus, and a third aircraft systems bus.

These and other features, aspects and advantages of the present disclosure will become better understood with reference to the following description and appended claims. The accompanying drawings, which are incorporated in and constitute a part of this specification, illustrate aspects of the disclosure and, together with the description, serve to explain the principles of the disclosure.

BRIEF DESCRIPTION OF THE DRAWINGS

A full and enabling disclosure of the present description, including the best mode thereof, directed to one of ordinary skill in the art, is set forth in the specification, which makes reference to the appended FIGS., in which.

DETAILED DESCRIPTION

Example aspects of the present disclosure are directed to an electrical system for an aircraft. An aircraft electrical system that can leverage the available electric power system so that it can be used for multiple aircraft systems with high power demand (e.g., flight controls, gallery loads, and electrical actuators, propulsion systems, environmental control systems, etc.) congruently can improve aircraft performance.

The disclosure describes how an engine, such as, but not limiting to, a turboprop engine or a turbo shaft engine can be utilized to generate power from the engine with multiple spools for a first load, a second load, and a third load, which can be the high-power demand aircraft systems. The optimization of power allocation can be achieved by intelligent controllers such as a Propulsion System Controller (PSC), a Bus Power Control Unit (BPCU), or a combination thereof. Both these controllers can interface with at least one Full Authority Digital Engine Control (FADEC). These controllers (PSC, BPCU, FADEC, or a combination thereof) can work together to command the power resources for each load to ensure full flight envelope performance.

As used herein, the term "set" or a "set" of elements can be any number of elements, including only one. As used herein, the terms "axial" or "axially" refer to a dimension along a longitudinal axis of an engine or along a longitudinal axis of a component disposed within the engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to a direction toward the rear or outlet of the engine relative to the engine centerline.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

Additionally, while terms such as "voltage", "current", and "power" can be used herein, it will be evident to one skilled in the art that these terms can be interrelated when describing aspects of the electrical circuit, or circuit operations.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus. Additionally, as used herein, "electrical connection" or "electrically coupled" can include a wired or wireless connection. The exemplary drawings are for purposes of illustration only and the dimensions, positions, order and relative sizes reflected in the drawings attached hereto can vary.

Additionally, as used herein, a "controller" or "controller module" can include a component configured or adapted to provide instruction, control, operation, or any form of communication for operable components to effect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein. In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or less than the second value, or being within the value range of the second value. It will be understood that such a determination may easily be altered to be satisfied by a positive/negative comparison or a true/false comparison. Example comparisons can include comparing a sensed or measured value to a threshold value or threshold value range.

As used herein, an "essential" electrical load can be a subset of one or more electrical loads of a power distribution system or architecture classified or categorized as "essential" or "critical" to the operation of the power architecture, vehicle, or another system. In one non-limiting aspect, an "essential" electrical load can be critical to flight operations of an aircraft or critical aircraft systems, and can be defined by relevant federal aircraft regulations or relevant industry standards.

Reference now will be made in detail to aspects of the present disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one aspect can be used with another aspect to yield a still further embodiment. Thus, it is intended that the present disclosure covers such modifications and variations as come within the scope of the appended claims and their equivalents.

As used herein, the term "about," when used in reference to a numerical value is intended to refer to within 30% of the numerical value. As used in the specification and the appended claims, the singular forms "a," "an," and "the" include plural referents unless the context clearly dictates otherwise.

Figure 1:
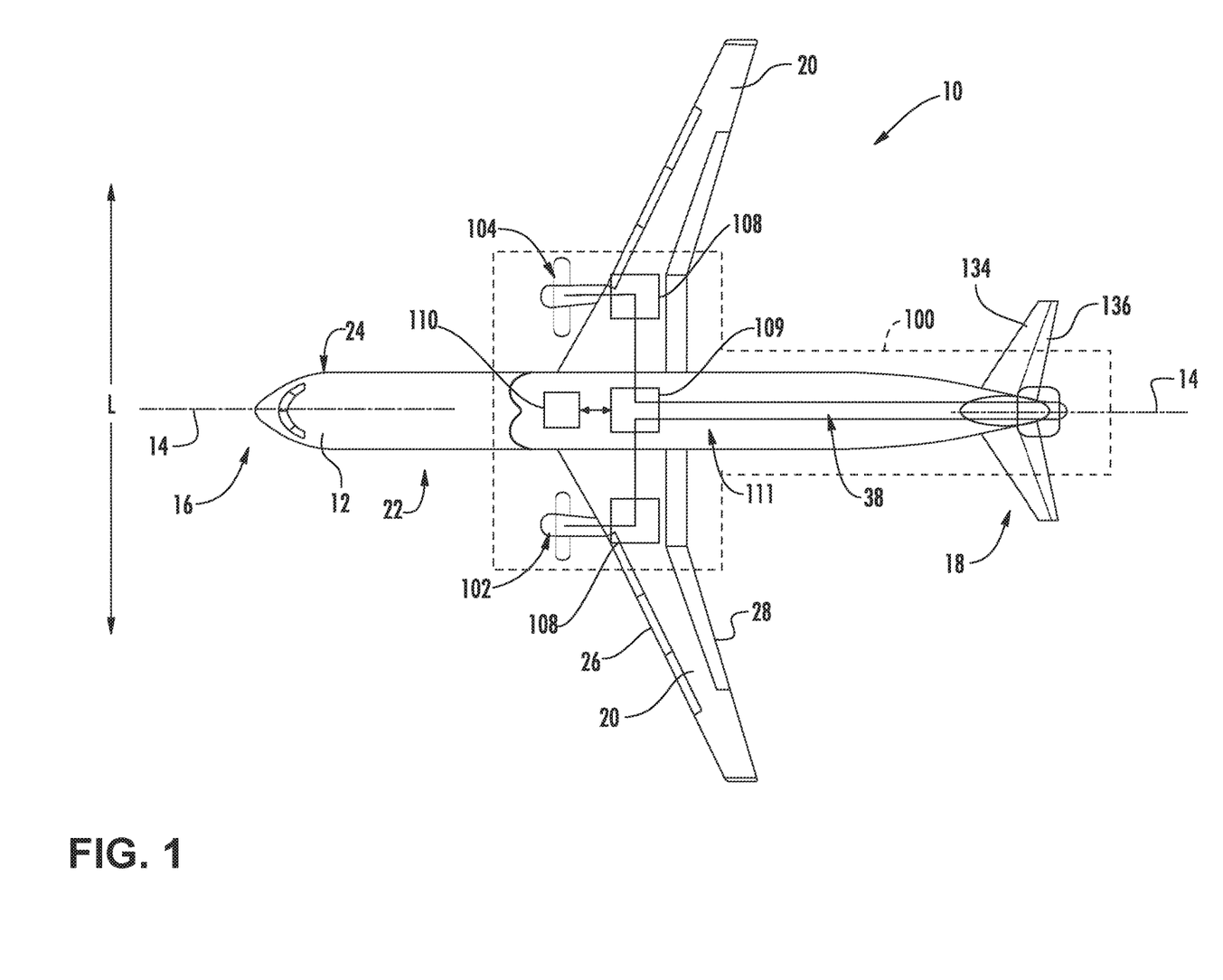
FIG. 1 illustrates a schematic top view of an aircraft in accordance with various aspects described herein.

FIG. 1 depicts a top-down schematic view of an example aircraft 10 according to example aspects of the present disclosure. The aircraft defines a longitudinal centerline 14 that extends there through, a vertical direction, a lateral direction, L, a forward end 16, and an aft end 18. Moreover, the aircraft 10 defines a mean line extending between the forward end 16 and aft end 18 of the aircraft 10. As used herein, the "mean line" refers to a midpoint line extending along a length of the aircraft 10, not taking into account the appendages of the aircraft 10 (such as the wings 20 and stabilizers discussed below).

Moreover, the aircraft 10 includes a fuselage 12, extending longitudinally from the forward end 16 of the aircraft towards the aft end 18 of the aircraft 10, and a pair of wings 20. As used herein, the term "fuselage" generally includes all of the body of the aircraft 10, such as an empennage of the aircraft 10. The first such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the example aspect depicted includes one or more leading edge flaps 26 and one or more trailing edge flaps 28. The aircraft 10 further includes a vertical stabilizer having a rudder flap for yaw control, and a pair of horizontal stabilizers 134, each having an elevator flap 136 for pitch control. The fuselage 12 additionally includes an outer surface or skin 38. It should be appreciated however, that in other example aspects of the present disclosure, the aircraft 10 may additionally or alternatively include any other suitable configuration of stabilizer that may or may not extend directly along the vertical direction or horizontal/lateral direction L.

The example aircraft 10 of FIG. 1 includes a system 100. The example system 100 includes one or more aircraft engines. For example, the aspect depicted includes a plurality of aircraft engines, shown as engines 102, 104, each configured to be mounted to the aircraft 10. More specifically, in the aspects of the disclosure depicted, the aircraft engines 102, 104 are configured as gas turbine engines 102, 104, or rather as turboprop or turboshaft engines, attached to and suspended beneath the wings 20 in an under-wing configuration.

In one non-limiting example aspect of the disclosure, the system 100 can further includes one or more electric generators 108 kinetically connected with the engines 102, 104. For example, one or both of the engines 102, 104 may be configured to provide mechanical power from a rotating shaft (such as an LP shaft or HP shaft) to the electric generators 108. Although depicted schematically outside the respective engines 102, 104, in certain aspects, the electric generators 108 may be positioned within or proximate to a respective engine 102, 104. Additionally, the electric generators 108 may be configured to convert the mechanical power to electrical power. For the aspect depicted, the system 100 includes at least one electric generator 108 for each engine 102, 104 and also includes a power conditioner 109 and an energy storage device 110.

The electric generator 108 may send electrical power to the power conditioner 109, which may transform, convert, alter, or the like, the electrical energy generated by the generators 108 and output a different form, such as by rectifying, inverting, altering voltage or current levels, altering a current frequency, a combination thereof, or the like. The output different form of electrical energy can further be provided or delivered for storage of the energy in the energy storage device 110, or can be provided or delivered to power-consuming systems of the aircraft 10. For the aspect depicted, the electric generators 108, power conditioner 109, and energy storage device 110 are all connected by way of an electric communication bus 111, such that the electric generator 108 may be electrically connected with the energy storage device 110, a subset thereof, and such that the electric generator 108 may provide electrical power to the energy storage device 110. Accordingly, in such an aspect, the system 100 may be referred to as a gas-electric propulsion system.

Figure 2:
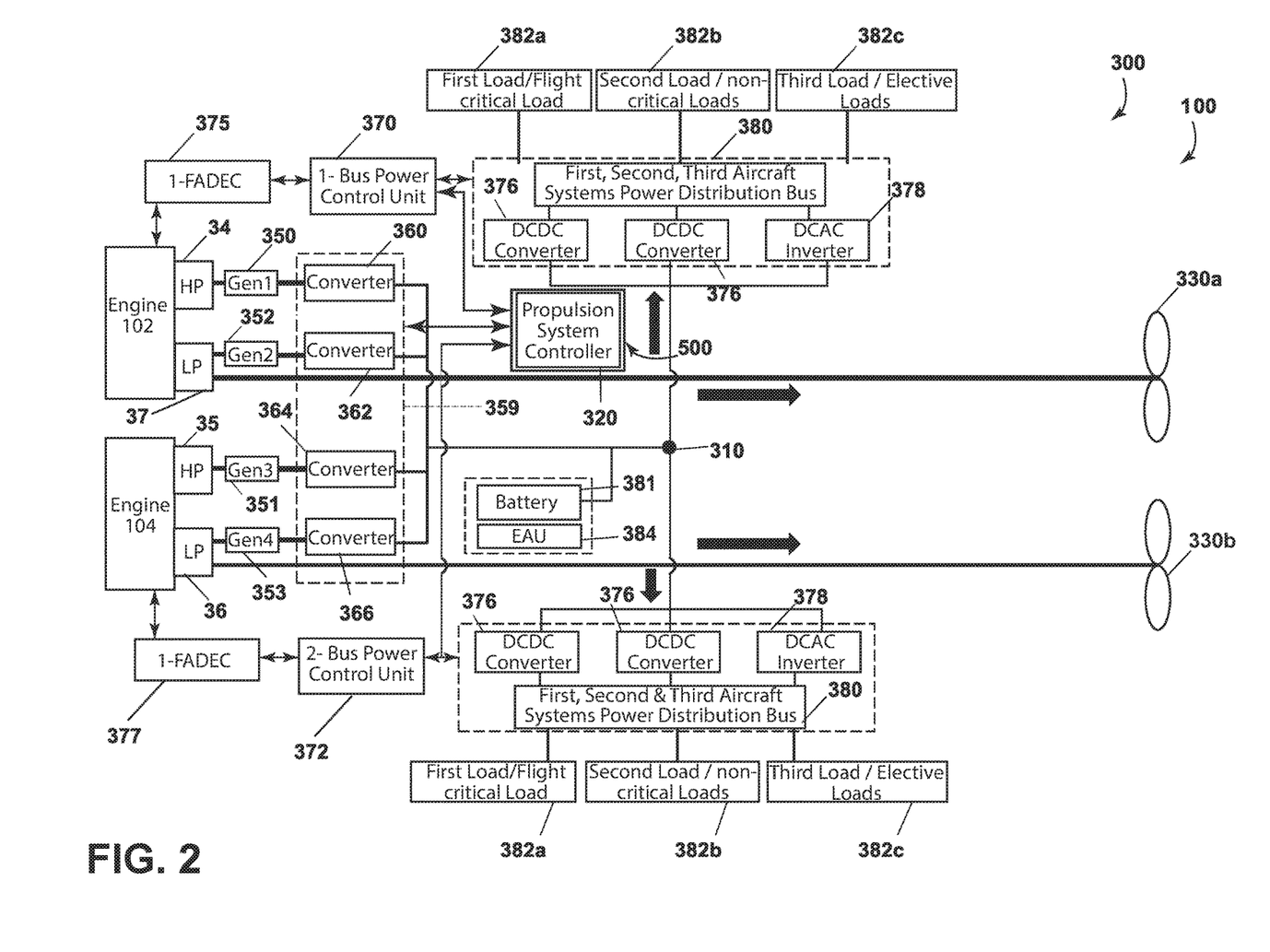
FIG. 2 illustrates a schematic diagram of an electrical system of the aircraft of FIG. 1, in accordance with various aspects described herein.

FIG. 2 depicts a diagram of the system 100 in a non-limited example of a dual-spool electrical system 300 according to example aspects of the present disclosure. Electrical system 300 can include engines 102, 104. Engines 102, 104 can be gas turbine engines as described above in FIG. 1. Each respective engine 102, 104 can include a HP spool 34, 35 and a LP spool 36, 37. The HP spool 34 of the first engine 102 can be configured to drive a first generator 350 and provide a first electrical output. The LP spool 37 of the first engine 102 can be configured to drive a second generator 352 and provide a second electrical output. Similarly, the HP spool 35 of the second engine 104 can be configured to drive a third generator 351 and provide a third electrical output. The LP spool 36 of the second engine 104 can be configured to drive a fourth generator 353 and provide a second electrical output.

In an example aspect, the HP spool 34 can be used as a starter generator to provide in-air cross-engine electric start. Thus, engines 102, 104 can be started from the HP spool 34 only. According to another example aspect, the HP 34, 35 and LP 36, 37 generators on each engine 102, 104 can be rated for 250 kW and 750 kW respectively depending on maximum horsepower extraction capability of the engine. Therefore, each engine 102, 104 can provide about 1 MW of electric power output through these generators. Each respective electrical output can be connected with a set of converters 359, such as the power conditioner 109 of FIG. 1. The electrical output from the first generator 350 can be connected to a first converter 360, the electrical output from the second generator 352 can be connected to a second converter 362. The electrical output from the third generator 351 can be connected to a third converter 364. The electrical output from the fourth generator 353 can be connected to a fourth converter 366. In one non-limiting example, the set of converters 359 can be used to convert AC power generated by the set of generators 350, 352, 351, 353 to DC power to be provided to an electrical power distribution bus 310.

A control system 500 (e.g., a control system comprising one or more controllers such, as but not limited to, a full authority digital engine controllers (FADEC), a bus power control units (BPCU), a propulsion system controllers (PSC), etc.) can be used to control electrical power flow throughout the aircraft 10. Multiple controllers can be included for redundancy management of power distribution. As shown in FIG. 2, the control system 500 can include a propulsion system controller (PSC) 320 having a controller module 510 (shown in FIG. 5) and configured to communicate with the set of converters 359. For example, the propeller 330a, 330b can require 400 kW during take-off and 200 kW during cruise condition, which can yield substantial engine power available during cruise condition for elective aircraft systems.

According to example aspects of the present disclosure, the PSC 320 can also be coupled to the bus power control units (BPCUs) 370, 372. The BPCUs 370, 372 can be used to control the distribution of electrical power between multiple distribution buses within the aircraft 10. The BPCUs 370, 372 and the PSC 320 can command the power resources (e.g., HP and LP generator systems) to provide power to aircraft systems to ensure full flight performance. In other example aspects, the PSC 320 or the BPCUs 370, 372 can be configured to manage a power split among the first generator 350, the second generator 352, the third generator 351, the fourth generator 353, or an optional battery unit 381. The PSC 320 can manage the power split by selectively sending control signals to the set of converters 359. The BPCUs 370, 372 can manage the power split by selectively sending control signals to the aircraft systems power distribution bus during specific phases of operation or conditions of operation.

For example, the total engine power extraction is based on the sum of mechanical propulsion power needed by the propellers 330a, 330b and the electrical power needed for the additional aircraft systems. Therefore, if the HP 34, 35 and the LP 36, 37 are rated for 50 kW and 350 kW, respectively, then the total electric power output from the engines 102 and 104 is 800 kW through the generators 350, 352, 351, and 353, and propeller power 200 kW during cruise condition and 400 kW during takeoff condition which can be extracted depending on the operational phase of the aircraft 10. Therefore, engine is sized at 1 MW to provide maximum electric power extraction of 800 kW electrical power from all generators and 200 kW propeller power during cruise condition from the engine. During cruise condition, excess power is available for electrical generators and aircraft electrical bus from engine due to reduced propeller power demand Another non-limiting example can occur if an operational phase of the aircraft 10 operates with the first load 382a requiring 100 kW, the second load requiring 600 kW and the third load requiring 100 kW. In response to such load requirements, the PSC 320 and the BPCUs 370, 372 can manipulate the power distribution to accommodate the operational phase of the aircraft 10.

The PSC 320 and the BPCUs 370, 372 can also communicate with a vehicle management system (VMS) via the FADEC 375, 377 to improve overall flight performance. The FADEC's basic purpose is to provide optimum engine efficiency for the given flight condition. FIG. 2 shows two BPCUs 370, 372 and two FADECs 375, 377 for simplification. However, the controllers can be in a variety of different arrangements based on installation, weight impact, etc.

The FADEC 375, 377 can receive multiple input variables of the current flight conditions including air density, throttle lever position, engine temperatures, engine pressures, and many other parameters. The inputs are received by an electronic engine controller (EEC) (not shown) located within the FADEC 375, 377 and analyzed up to 70 times per second. Engine operating parameters such as fuel flow, stator vane position, air bleed valve position, and others can be manipulated in response to the FADEC 375, 377 analyzing the multiple input variables. The FADECs 375, 377 can be configured to control all aspects of engines 102, 104 (e.g., fuel consumption, speed, thrust, etc.). The FADEC 375, 377 can also control engine starting and restarting. A benefit of the FADEC 375, 377 can include the manufacturer's capability to program engine limitations and receive engine health and maintenance reports. For example, to avoid exceeding a certain engine temperature, the FADEC 375, 377 can be programmed to automatically take the necessary measures without requiring pilot intervention.

The electrical system 300 can also include the first, second, and third aircraft systems power distribution bus 380. The bus 380 can include DC-DC converters 376 and DC-AC inverter 378. DC-DC converters 376 can be implemented to convert the high voltage (e.g., ±960 Vdc) from a hybrid electric bus to the power needs for additional aircraft systems (e.g., 270 Vdc). The additional aircraft systems can include a first load 382a, a second load 382b, a third load 382c. While a single respective load 382a, 382b, 382c is shown for brevity, each respective load 382a, 382b, 382c can represent a respective set of electrical loads. The first load 382a, the second load 382b, and the third load 382c can include flight critical systems, non-critical systems, and elective systems.

For example, the flight critical systems can include communication systems, exterior lighting systems, water/waste systems, navigation systems, flight control systems, landing systems, etc. Non-critical systems can include interior lighting systems, refrigeration systems, interior climate control systems, entertainment systems, etc. Elective systems can include environmental systems such as de-icing systems, engine cooling systems, or any other high-power demand system for discretionary operations that require significant electric power coupled to the aircraft 10 that can be selectively enabled during particular flight operations, flight parameters, flight demands, or the like. Stated another way, the elective systems of the third load 382c are non-continuously used systems that include a temporary high-power demand, which may otherwise interrupt the ability of the electrical 300 to meet the full power demand of the aircraft.

In example aspects, the electrical system 300 can include DC-AC inverters 378 configured to provide AC power to one or more loads 382a, 382b, 382c on the aircraft, which requires AC power. For instance, DC-AC inverter 378 can convert the high voltage DC power from the hybrid electric bus (e.g., ±960 Vdc) to a required AC power (e.g., 115 Vac, 3-phase, 40 Hz) to be delivered to AC loads. There can be multiple DC-DC converters 376 and DC-AC 378 converters depending on load analysis, redundancy needs and architecture definition. The electrical system 300 can also include electrical accumulator unit (EAU) 384 to supplement the HP/LP 34/36 generator output power to provide transient performance and an electric start during an engine failure (e.g., act as a micro-grid).

The electrical system 300 can also include a battery energy storage system 381. The battery energy storage system 381 can be coupled to the electrical power distribution bus 310. The battery energy storage system 381 can include a battery energy storage device 381 configured to supply a battery power. The power supplied by the battery energy storage system 381 can be managed using the PSC 320 or the BPCU 370, 372 controllers. For example, the PSC 320 can be configured to manage the battery power through the power distribution bus 310 from the battery energy storage system 381 to supplement the electrical power supplied by the first generator 350, the second generator 352, the third generator 351, and the fourth generator 353. In a non-limiting example, the battery 381 can be rated for 10 kWh. The PSC 320 can manage the battery power to use 10 kW power for one hour or 100 kW (10C) power for six minutes.

Figure 3:
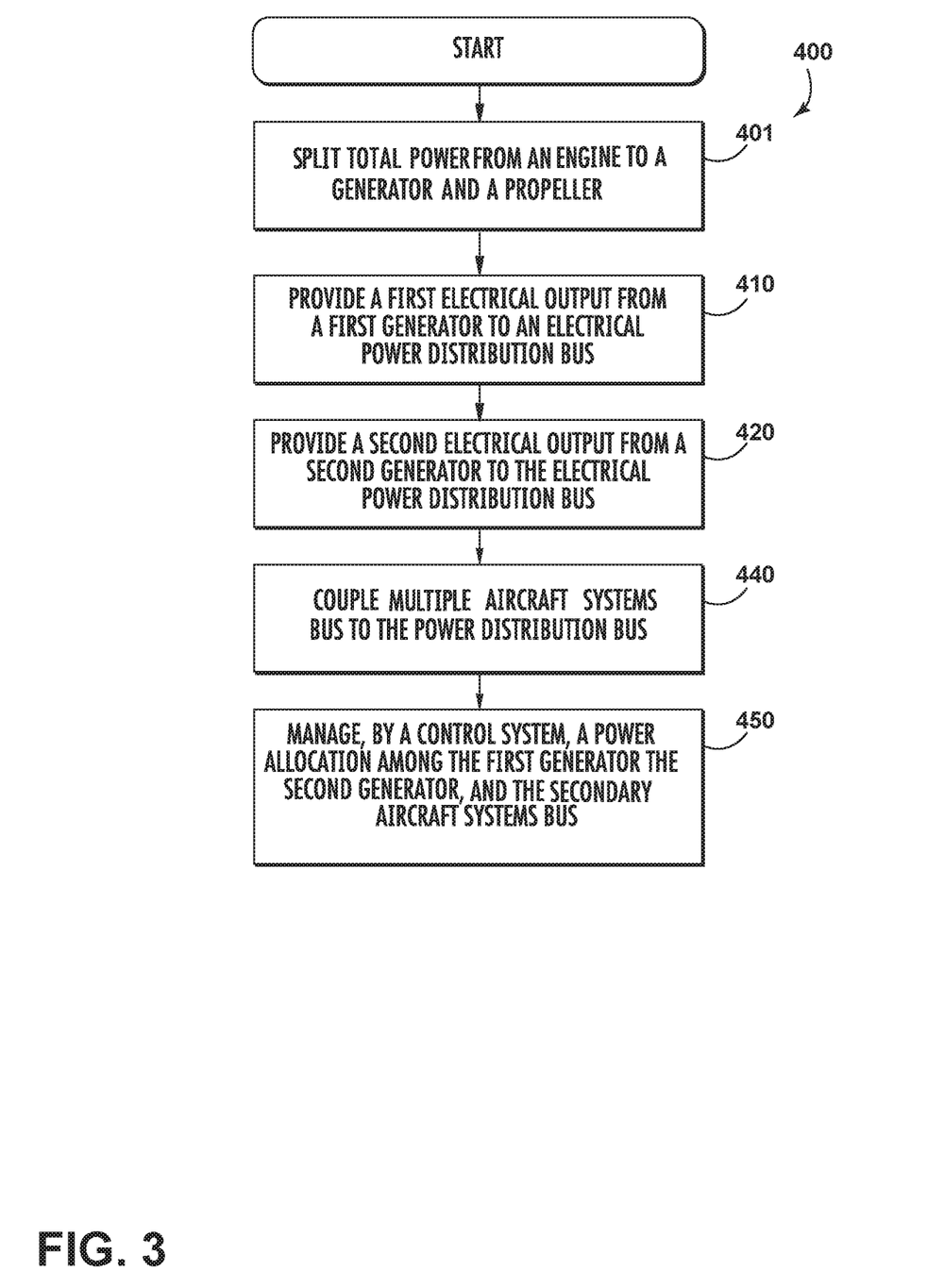
FIG. 3 illustrates a flow diagram of an example method in accordance with various aspects described herein.

FIG. 3 depicts a flow diagram of an example method 400 according to example aspects of the present disclosure. FIG. 3 depicts steps performed in a particular order for purposes of illustration and discussion. Those of ordinary skill in the art, using the disclosure provided herein, will understand that the method discussed herein can be adapted, rearranged, expanded, omitted, performed simultaneously, or modified in various ways without deviating from the scope of the present disclosure. Method 400 can be performed using the control system 500.

At 401 the method 400 can include splitting total power from the engine 102, 104 to a generator 352, 353 and a propeller 330a, 330b. The power allocated for the generator 352, 352 can be used to manage the first load 382a, the second load 382b, and the third load 382c. The power allocated for the propeller 330a, 330b can be extracted via the low spool 36, 37 without compromising the stall margin.

At 410 the method 400 can include providing a first electrical output from a first generator 350 to the electrical power distribution bus 310. The PSC 320 can be used or configured to control electrical output from the first generator 350. Converters 360, 362, 364, and 366, or a subset thereof, can be used to convert electrical output from the first generator 350 into power suitable for the electrical power distribution bus 310 (e.g., convert AC power from the first generator 350 to DC power).

At 420 the method 400 the PSC 320 can be used to control electrical power from the second generator 352 to the electrical power distribution bus 310.

At 440 the method 400 the PSC 320 can be used to couple a first aircraft systems bus, a second aircraft systems bus, and a third aircraft systems bus 380 to the power distribution bus 310. In example aspects, BPCUs 370, 372 can be used to control power to the secondary aircraft systems bus 380. The secondary aircraft systems bus 380 can include DC-DC converters 376 and DC-AC converters 378. Secondary aircraft systems can include flight controls, galley loads, and electrical actuators. Secondary aircraft systems can also include flight critical and non-critical loads 382. As shown in FIG. 3, BPCUs 370, 372 can be used to manage the power allocation to secondary aircraft systems.

At 450 the method 400 can include managing, by a control system 500, a power allocation among the first generator 350, the second generator 352, the propulsion system 100, the first aircraft systems bus, the second aircraft systems bus, and the third aircraft systems bus 380. According to example aspects, the electrical system 300 can leverage the available multi-spool power extraction to improve energy sources for the secondary aircraft systems. The power allocation can be achieved by intelligent controllers such as PSC 320 and BPCUs 370, 372. The PSC 320 and BPCUs 370, 372 can interface with FADECs 375, 377. These controllers can work together to command the power sources (e.g., HP and LP generator systems) to provide the required power for propulsion and secondary aircraft systems. For example, PSC 320 can be used to allocate power among the first generator 350, the second generator 352, the third generator 351, the fourth generator 353. In other example aspects, the PSC 320 and BPCUs 370, 372 can be used to allocate power among additional aircraft systems through the FADECs 375, 377. For instance, the power allocation can be managed depending on phase of the flight envelope (e.g. taxi, take off, climb, cruise, descent, land, etc.). In other example aspects, the power allocation can be determined depending on aircraft load demand and depending on emergency conditions (e.g., single engine failure). This method of power allocation can be changed at any time during the flight phase based on a number of conditions. This method of power allocation provides an efficient usage of available power instead of dedicated separate power sources for secondary systems. Management of electrical power from HP 34 and LP 36 spool of each engine and additional systems 380 can help to improve full flight performance while achieving greater fuel efficiency. For example, if 1 MW total power is available from both engines, then the power can be spilt 20% for cruise propulsion operation, 10% for flight critical loads, and 10% for non-critical loads 382b, and 50% for elective loads 382c. The total power split can also change at any time during the current flight phase or future flight phases. A benefit of splitting the power can be to provide optimum usage of available power instead of dedicated separate power sources.

Figure 4:
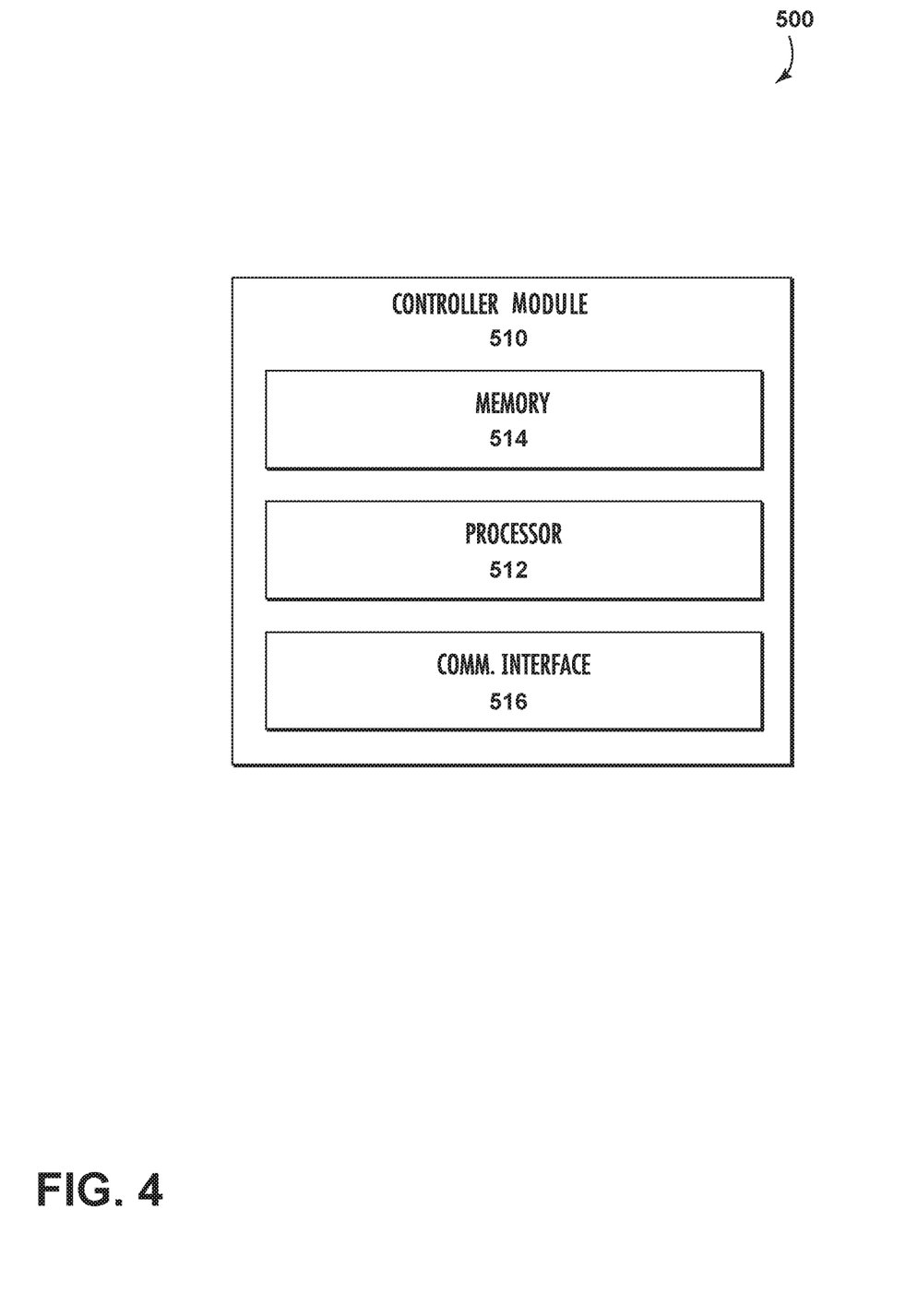
FIG. 4 illustrates an example controller module in accordance with various aspects described herein.

FIG. 4 depicts an example controller module 510 of the control system 500 according to aspects of the present disclosure. The controller module 510 can include one or more processors(s) 512 and one or more memory devices(s) 514. The one or more processors(s) 512 can include any suitable processing device, such as a microprocessor, microcontrol device, integrated circuit, logic device, or the like. The one or more memory devices(s) 514 can include one or more computer-readable media, including, but not limited to, non-transitory computer-readable media, RAM, ROM, hard drives, flash drives, or the like.

The one or more memory device(s) 514 can store information accessible by the one or more processor(s) 512, including computer-readable instructions that can be executed by the one or more processors(s) 512. The instructions can be any set of instructions that when executed by the one or more processors(s) 512, cause the one or more processors(s) 512 to perform operations. In some aspects, the instructions can be executed by the one or more processor(s) 512, to cause the one or more processors(s) 512 to perform operations. In some aspects, the instructions can be executed by the one or more processor(s) 512 to cause the one or more processor(s) to perform operations, such as any of the operations and functions for which the control module 510 is configured. For instance, the operations can be used for performing method 400, as described herein, or any other operations or functions of the one or more control system. The instructions can be software written in any suitable programming language or can be implemented in hardware. Additionally, or alternatively, the instructions can be executed in logically or virtually separate threads on processor(s) 512. The memory device(s) 514 can further store data that can be accessed by the processor(s) 512. For example, the data can include data indicative of power flows, current flows, temperatures, actual voltages, nominal voltages, gating commands, switching patterns, or any other data/or information described herein.

The controller module 510 can also include a communication interface 516. The communication interface 516 can include suitable components for interfacing with one or more network(s), devices, or the like, including for example, transmitters, receivers, ports, control devices, antennas, or other suitable components. For example, the communication interface 516 can be configured to communicate with a control system, such as the control module 510.

In this way, example aspects of the present disclosure can provide a number of technical effects and benefits. For instance, the technical effect of above described aspects enable managing a power split between the multiple high power demand aircraft systems and can help improve power utilization during full flight performance Improved power utilization can result in, for example, achieving better fuel efficiency. Managing the power split can also eliminate the need for larger engines with dedicated power sources for high demand power-consuming aircraft systems, such as, but not limited to, propulsion systems, non-propulsions systems, environmental control systems, additional customize high power demand systems. Another benefit of the present disclosure can include eliminating the need for separate power generators coupled to an engine for powering flight critical systems, non-critical systems, and elective systems. The system also eliminates the need to have separate gearboxes or gearbox pads to accommodate additional generators or power sources dedicated to specific aircraft systems.

Another benefit of the present disclosure can include the multi-spool power extraction from the engine, which can enable full-flight envelope performance by providing sufficient engine stall margin during corner point operating conditions of the flight envelope. Also, by utilizing higher voltage power (e.g. power greater than 270 VDC or 230 VAC, the power distribution feeder cable weight can be reduced for the power bus for additional systems.

Another benefit of the present disclosure can include optimized aircraft flight performance by balancing fuel efficiency and full flight operability due to electrical communicate between the FADEC 375, 377, the BPCU 370, 372, and the PSC controller 320. Also, the optional battery 381 can provide hybrid electric propulsion capability then it can be used for emergency conditions (e.g. engine failure/s) to provide power for flight controls and essential secondary loads to land safely. This will eliminate need for separate emergency power source e.g. RAT or APU.

Many other possible configurations in addition to those shown in the above figures are contemplated by the present disclosure. To the extent not already described, the different features and structures of the various aspects can be used in combination with others as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

Further aspects of the invention are provided by the subject matter of the following clauses:

An aircraft system comprising, a first turbine engine, the first turbine engine having a first high pressure (HP) spool and a first low pressure (LP) spool, the first HP spool configured to drive a first generator and provide a first electrical output, the LP spool configured to drive a second generator and provide a second electrical output, the first generator and the second generator coupled to an electrical power distribution bus that provides electrical power to a first load, a second load, and a third load, a first propeller coupled to the first LP spool, wherein the first propeller is driven by the first turbine engine, a propulsion system defined by a first propeller, a first aircraft systems bus coupled to the electrical power distribution bus, a second aircraft systems bus coupled to the electrical power distribution bus, a third aircraft systems bus coupled to the electrical power distribution bus, and a control system configured to allocate power among each generator, a propulsion system controller (PSC), each aircraft systems bus, and one or more bus power control unit (BPCU) controllers, wherein the control system controls power allocation of the first turbine engine among each generator and the propulsion system, and the control system controls power delivery from the electrical power distribution bus to each aircraft systems bus.

The system of any of the preceding clauses, further comprises a second turbine engine, the second turbine engine having a second high pressure (HP) spool and a second low pressure (LP) spool, the second HP spool configured to drive a third generator and provide a third electrical output, the second LP spool configured to drive a fourth generator and provide a fourth electrical output, the third generator and the fourth generator coupled to an electrical power distribution bus that provides electrical power to a first load, a second load, and a third load.

The system of any of the preceding clauses, further comprises a second propeller coupled to the second LP spool, wherein the second propeller is driven by the second turbine engine.

The system of any of the preceding clauses, wherein the first turbine engine and the second turbine engine each drives a transmission coupled to an aircraft structure.

The system of any of the preceding clauses, wherein the control system is further configured to split a total power from the first turbine engine between the first propeller and each aircraft systems bus.

The system of any of the preceding clauses, wherein the first aircraft systems bus, the second aircraft systems bus, and the third aircraft systems bus are electrically coupled to a first load, a second load, and a third load, respectively.

The system of any of the preceding clauses, wherein at least one of the first load and the second load, operate concurrently with the third load.

A method of powering an aircraft system having a first turbine engine, the first turbine engine having a first high pressure (HP) spool and a first low pressure (LP) spool, the first HP spool configured to drive a first generator and provide a first electrical output, the first LP spool coupled to a propeller configured to drive a second generator, provide a second electrical output, and drive the propeller, the method comprising, splitting a total power from the first turbine engine to the second generator and the propeller, providing the first electrical output from the first generator to an electrical power distribution bus, providing the second electrical output from the second generator to the electrical power distribution bus, coupling a first aircraft systems bus, a second aircraft systems bus, and a third aircraft systems bus to the electrical power distribution bus, and managing a power allocation among the first generator and the second generator, to the first aircraft systems bus, a second aircraft systems bus, and a third aircraft systems bus from the electrical power distribution bus via a control system having a propulsion system controller (PSC) communicatively coupled to at least one bus power control unit controllers (BPCU) and at least one FADEC.

The method of any of the preceding clauses, further comprises providing a third electrical output from a second high pressure (HP) spool coupled to a second turbine engine, wherein the second HP spool configured to drive a third generator to the electrical power distribution.

The method of any of the preceding clauses, further comprises providing a fourth electrical output from a second low pressure (LP) spool coupled to the second turbine engine, wherein the low LP spool configured to drive a fourth generator to the electrical power distribution.

The method of any of the preceding clauses, further comprises driving a first propeller by the first turbine engine coupled to the first LP spool.

The method of any of the preceding clauses, further comprises driving a second propeller by the second turbine engine coupled to the second LP spool.

The method of any of the preceding clauses, further comprises managing a power distribution to at least one of a first load, a second load, and a third load respectively coupled to the first aircraft systems bus, the second aircraft systems bus, and the third aircraft systems bus.

The method of any of the preceding clauses, wherein managing the power distribution to at least one of the first load, the second load, the third load comprises distributing power concurrently between each load.

An electrical system for an aircraft having a first turbine engine, the first turbine engine having a first high pressure (HP) spool and a first low pressure (LP) spool, the electrical system comprising, a first generator coupled to the first HP spool driven by the first turbine engine and providing a first electrical output, a second generator coupled to the first LP spool driven by the first turbine engine and providing a second electrical output, the first generator and the second generator coupled to an electrical power distribution bus that provides electrical power to a first load, a second load, and a third load, a propulsion system controller coupled to the electrical power distribution bus, a first aircraft systems bus, a second aircraft systems bus, and a third aircraft systems bus coupled to the electrical power distribution bus, a first load, a second load, and a third load coupled to the first aircraft systems bus, the second aircraft systems bus, and the third aircraft systems bus respectively, and a control system configured to allocate power to at least one of the first load, the second load, and the third load from the first generator and the second generator via the propulsion system controller, the first aircraft systems bus, the second aircraft systems bus, and a third aircraft systems bus.

The system of any of the preceding clauses, further comprises a second turbine engine, the second turbine engine having a second high pressure (HP) spool and a second low pressure (LP) spool, the second HP spool configured to drive a third generator and provide a third electrical output, the second LP spool configured to drive a fourth generator and provide a fourth electrical output, the third generator and the fourth generator coupled to an electrical power distribution bus that provides electrical power to a first load, a second load, and a third load.

The system of any of the preceding clauses, further comprises a second propeller coupled to the second LP spool, wherein the second propeller is driven by the second turbine engine The system of any of the preceding clauses, wherein the first turbine engine and the second turbine engine each drives a transmission coupled to an aircraft structure.

The system of any of the preceding clauses, wherein the propulsion system controller comprises a combination of gas and electric power sources.

The system of any of the preceding clauses, wherein at least one of the first load and the second load operate concurrently with the third load.

This written description uses examples for the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft system comprising:
 a first turbine engine, the first turbine engine having a first high pressure (HP) spool and a first low pressure (LP) spool, the first HP spool configured to drive a first generator and provide a first electrical output, the LP spool configured to drive a second generator and provide a second electrical output, the first generator and the second generator coupled to an electrical power distribution bus that provides electrical power to a first load, a second load, and a third load;
 a second turbine engine, the second turbine engine having a second high pressure (HP) spool and a second low pressure (LP) spool, the second HP spool configured to drive a third generator and provide a third electrical output, the second LP spool configured to drive a fourth generator and provide a fourth electrical output, the third generator and the fourth generator coupled to an electrical power distribution bus that provides electrical power to the first load, the second load, and the third load;
 a first propeller coupled to the first LP spool, wherein the first propeller is driven by the first turbine engine;
 a second propeller coupled to the second LP spool, wherein the second propeller is driven by the second turbine engine;
 a propulsion system defined by the first propeller;
 a first aircraft systems bus coupled to the electrical power distribution bus;
 a second aircraft systems bus coupled to the electrical power distribution bus;
 a third aircraft systems bus coupled to the electrical power distribution bus; and
 a control system configured to allocate power among each generator, a propulsion system controller (PSC), each aircraft systems bus, and one or more bus power control unit (BPCU) controllers, wherein the control system controls power allocation of the first turbine engine among each generator and the propulsion system, and the control system controls power delivery from the electrical power distribution bus to each aircraft systems bus.

2. The system of claim 1, wherein the control system is further configured to split a total power from the first turbine engine between the first propeller and each aircraft systems bus.

3. The system of claim 1, wherein the first aircraft systems bus, the second aircraft systems bus, and the third aircraft systems bus are electrically coupled to the first load, the second load, and the third load, respectively.

4. The system of claim 3, wherein at least one of the first load and the second load, operate concurrently with the third load.

5. A method of powering an aircraft system having a first turbine engine, the first turbine engine having a first high pressure (HP) spool and a first low pressure (LP) spool, the first HP spool configured to drive a first generator and provide a first electrical output, the first LP spool coupled to a first propeller configured to drive a second generator, provide a second electrical output, and drive the first propeller, the method comprising:
- splitting a total power from the first turbine engine to the second generator and the first propeller;
- providing the first electrical output from the first generator to an electrical power distribution bus;
- providing the second electrical output from the second generator to the electrical power distribution bus;
- providing a third electrical output from a second high pressure (HP) spool coupled to a second turbine engine, wherein the second HP spool configured to drive a third generator to the electrical power distribution;
- providing a fourth electrical output from a second low pressure (LP) spool coupled to the second turbine engine, wherein the low LP spool configured to drive a fourth generator to the electrical power distribution;
- coupling a first aircraft systems bus, a second aircraft systems bus, and a third aircraft systems bus to the electrical power distribution bus;
- driving a second propeller by the second turbine engine coupled to the second LP spool; and
- managing a power allocation among the first generator and the second generator, to the first aircraft systems bus, a second aircraft systems bus, and a third aircraft systems bus from the electrical power distribution bus via a control system having a propulsion system controller (PSC) communicatively coupled to at least one bus power control unit controllers (BPCU) and at least one full authority digital engine control (FADEC).

6. The method of claim 5 further comprises driving the first propeller by the first turbine engine coupled to the first LP spool.

7. The method of claim 5 further comprises managing a power distribution to at least one of a first load, a second load, and a third load respectively coupled to the first aircraft systems bus, the second aircraft systems bus, and the third aircraft systems bus.

8. The method of claim 7, wherein managing the power distribution to at least one of the first load, the second load, the third load comprises distributing power concurrently between each load.

9. An electrical system for an aircraft having a first turbine engine, the first turbine engine having a first high pressure (HP) spool and a first low pressure (LP) spool, and a second turbine engine, the second turbine engine having a second high pressure (HP) spool and a second low pressure (LP) spool, the electrical system comprising:
- a first generator coupled to the first HP spool driven by the first turbine engine and providing a first electrical output;
- a second generator coupled to the first LP spool driven by the first turbine engine and providing a second electrical output;
- a third generator coupled to the second HP spool driven by the second turbine engine and providing a third electrical output;
- a fourth generator coupled to the second LP spool driven by the second turbine engine and providing a fourth electrical output;
- a propulsion system defined by a first propeller and driven by the first turbine engine, and a second propeller coupled to the second LP spool, wherein the second propeller is driven by the second turbine engine;
- the first generator the second generator, the third generator, and the fourth generator coupled to an electrical power distribution bus that provides electrical power to a first load, a second load, and a third load;
- a propulsion system controller coupled to the electrical power distribution bus;
- a first aircraft systems bus, a second aircraft systems bus, and a third aircraft systems bus coupled to the electrical power distribution bus;
- the first load, the second load, and the third load coupled to the first aircraft systems bus, the second aircraft systems bus, and the third aircraft systems bus respectively; and
- a control system configured to allocate power to at least one of the first load, the second load, and the third load from the first generator and the second generator via the propulsion system controller, the first aircraft systems bus, the second aircraft systems bus, and a third aircraft systems bus.

10. The system of claim 9, wherein the propulsion system controller comprises a combination of gas and electric power sources.

11. The system of claim 9, wherein at least one of the first load and the second load operate concurrently with the third load.

* * * * *